United States Patent [19]
Wurzburg et al.

[11] 4,216,310
[45] Aug. 5, 1980

[54] CONTINUOUS PROCESS FOR PHOSPHORYLATING STARCH

[75] Inventors: Otto B. Wurzburg, Whitehouse Station; Wadym Jarowenko, Plainfield; Roger W. Rubens, Somerville, all of N.J.; Jayant K. Patel, Calcutta, India

[73] Assignee: National Starch and Chemical Corporation, Bridgewater, N.J.

[21] Appl. No.: 31,507

[22] Filed: Apr. 19, 1979

[51] Int. Cl.$^2$ .............................................. C08B 31/02
[52] U.S. Cl. ...................................... 536/109; 536/49; 536/108; 536/110
[58] Field of Search .................. 536/49, 109, 108, 110

[56] References Cited

U.S. PATENT DOCUMENTS

| | | | |
|---|---|---|---|
| 2,806,026 | 9/1967 | Evans | 260/233.3 |
| 2,824,870 | 2/1958 | Neukom | 260/233.5 |
| 2,884,413 | 4/1959 | Kerr et al. | 260/233.5 |
| 3,132,066 | 5/1964 | Kerr et al. | 260/233.5 |
| 3,459,632 | 8/1969 | Caldwell et al. | 260/233.3 |
| 3,793,310 | 2/1974 | Elizer | 536/49 |
| 4,166,173 | 8/1979 | Wurzburg et al. | 536/49 |

FOREIGN PATENT DOCUMENTS 36806 11/1965 Fed. Rep. of Germany.

Primary Examiner—Melvyn I. Marquis
Attorney, Agent, or Firm—Edwin Szala; Janet E. Hasak

[57] ABSTRACT

Starch is phosphorylated by a virtually pollution-free, continuous process whereby an aqueous reagent solution of a tripolyphosphate, orthophosphate or pyrophosphate salt or a mixture thereof is sprayed onto a moist starch cake on a rotary vacuum filter in an amount sufficient to achieve efficient impregnation of the starch cake without losing significant levels of salt to the effluent. In a preferred embodiment, the reagent solution contains alkali metal tripolyphosphate salt and is obtained by diluting a concentrated solution thereof. The thus-impregnated starch is subsequently dried and heat-reacted by known procedures to produce an orthophosphate starch monoester.

10 Claims, No Drawings

CONTINUOUS PROCESS FOR PHOSPHORYLATING STARCH

BACKGROUND OF THE INVENTION

I. Field of the Invention

This invention relates to an improved process for phosphorylating starch. More particularly, this invention is directed to a continuous process for preparing orthophosphate starch monoesters using a rotary vacuum filter.

II. Description of the Prior Art

Phosphorylation reactions of starch, wherein starch is impregnated with a phosphate salt and thereafter dried and heat-reacted to obtain an orthophosphate starch monoester, are well known in the art.

Numerous patents such as U.S. Pat. Nos. 2,806,026; 2,824,870; 2,884,412; 2,884,413; 2,961,440; and 3,132,066 disclose various phosphorylation techniques whereby the impregnation step is accomplished by adding the phosphate salt to the starch, either by spraying an aqueous solution of the salt on the dry starch or by adding salt to an aqueous slurry of starch and filtering or centrifuging the starch slurry, then drying by conventional means. Spray-drying may be used in place of filtration or centrifugation but it is a very costly operation.

The suspension method of impregnation, which was deemed necessary to insure even distribution and/or penetration of the reagent into the starch granules, has serious disadvantages because of the resulting filtrates which must be disposed of. The excess phosphate salt which does not penetrate the starch is lost to the filtrate and fed into the effluent, creating serious pollution problems. In commercial processes about 60% of the phosphate salt in the reagent solution is lost in the effluent.

In an effort to avoid the pollution problems caused by suspension impregnations, an alternative method of impregnation of starch with phosphate salt was proposed in E. Ger. Pat. No. 36,806. This method involves spraying dry, powdered starch with a concentrated solution of the phosphate salt or blending a wet starch cake with dry, powdered phosphate salt. In a third variation of this pollution-free impregnation, dry starch and dry salt are blended together and then sprayed with water to achieve dissolution of the phosphate salt and to distribute it evenly throughout the starch.

While the E. Ger. process represents an improvement over the suspension method of impregnation because pollution is minimized, it has several inherent disadvantages. Thus, the variation wherein dry reagent is added to wet starch cake requires special delivery equipment to sift the powdered reagent onto the wet starch. Blending dry starch with dry reagent requires prolonged mixing to achieve uniform distribution of the phosphate salt throughout the starch powder, which can result in poor granule penetration and, thus, low reaction efficiency. Moreover, the variation of spraying dry starch with phosphate salt solution, in addition to having the above disadvantage, involves a double drying procedure wherein the starch must be dried before use and dried again after spraying, adding appreciably to the cost of the process.

A further disadvantage of the E. Ger. process is that all of the mixing takes place in a blender so that metering of the reagent must be done carefully or the mixing done over a prolonged period of time to insure satisfactory distribution of the reagent within the starch. This becomes more critical when lower levels of substitution are desired and smaller amounts of reagent thus employed. Also such a blender is not a part of the processing equipment so that the phosphorylation process must be interrupted using this procedure.

Alkali metal tripolyphosphate salts are the preferred phosphate salts for phosphorylation reactions because they require a lower heat input for satisfactory phosphorylation and are, thus, most desirable from an energy standpoint. However, sodium tripolyphosphate, which is representative of this type of salt, has an overall solubility in water at 25° C. of only about 13% (see John von Wazer, "Phosphorus and Its Compounds", Vol. I: Chemistry, New York: Interscience Publishers, Inc., 1958, pp. 649–650). Thus, conventional sodium tripolyphosphate solutions of the prior art are relatively dilute.

U.S. Pat. No. 4,166,173 to O. B. Wurzburg et al. discloses an improved pollution-free process for phosphorylating starch using a concentrated reagent solution of alkali metal tripolyphosphate salt. The concentrated solution is used directly to impregnate a starch cake, with the impregnation step preferably carried out in a centrifuge in a semi-continuous process.

SUMMARY OF THE INVENTION

The present invention provides a continuous process for phosphorylating starch comprising the steps of:

a. forming a moist granular starch cake having no more than 45% by weight moisture on a rotary vacuum filter;

b. spraying onto said starch cake an aqueous solution of an alkali metal phosphate salt selected from the group consisting of tripolyphosphate salt, orthophosphate salt, pyrophosphate salt, and mixtures thereof in an amount sufficient to impregnate said starch cake with at least 0.5% by weight of total phosphate salt, based on starch solids, and sufficient to achieve efficient impregnation of the starch cake without introducing significant levels of said salt into the effluent;

c. drying the thus-impregnated starch; and d. heat-reacting the dried starch to obtain an orthophosphate starch monoester.

The rotary vacuum filter is a conventional apparatus designed for filtering slurries of various materials. Heretofore, this type of filter has not been employed in a process for impregnation. Thus, spraying of a starch cake with reagent solution in a rotary vacuum filter is a novel concept and results in a very efficient starch impregnation where little of the reagent is lost to the effluent causing pollution problems. Additionally, the impregnation step takes place in an apparatus which does not require prolonged mixing, which would interrupt the continuity of processing. Thus, the present process represents an improvement over prior art phosphorylation methods in that the impregnation step permits a continuous process which is substantially pollution-free.

In the method of impregnation of U.S. Pat. No. 4,166,173, which employs a concentrated solution of alkali metal tripolyphosphate salt as impregnating reagent and a centrifuge as the equipment used to form the starch cake, the reagent solution is added directly to the starch cake without dilution because the rapidly spinning basket of the centrifuge provides the forces necessary for penetration of a higher-solids, denser salt solution. However, when a rotary vacuum filter is used to form the starch cake as herein described, the concentrated reagent solution of tripolyphosphate salt must be diluted prior to impregnation of the starch to facilitate penetration and distribution of the salt within the starch cake. Diluting the concentrated solution is more desirable than diluting a solution having the conventional concentration of alkali metal tripolyphosphate salt because of reduced storage and preparation requirements for the concentrated solution.

The orthophosphate starch monoesters prepared by the process herein may be used in any applications wherein such starch derivatives are employed such as in foods and paper. These starch derivatives, and particularly the amphoteric derivatives, are especially useful as pigment retention aids in papermaking processes.

DESCRIPTION OF THE PREFERRED EMBODIMENTS

The term "orthophosphate starch monoesters" as used herein refers to simple, non-crosslinked esters of starch and orthophosphoric acid of the formula:

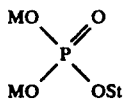

wherein M represents an alkali metal or hydrogen and St represents the starch radical.

Orthophosphate starch monoesters may be produced from many inorganic phosphate salts such as orthophosphates, metaphosphates, polymetaphosphates and pyrophosphates, as well as from tripolyphosphate salts. The invention herein is directed only to orthophosphoric starch monoesters prepared from tripolyphosphate, orthophosphate, and pyrophosphate salts, or mixtures thereof.

Suitable starch bases include, for example, those starch bases derived from corn, hybrid corn, potato, rice, sago, tapioca, waxy maize, sorghum, wheat, and the various derivatives of these starches. Hence, among applicable starches are included the various starch derivatives such as ethers, esters, thin-boiling types prepared by known processes such as mild acid treatments, oxidative, etc., and those derivatives of these starches which have high amylose contents, i.e., 50% or more by weight of amylose. Typical starches useful herein are tapioca, amioca and corn starch. In papermaking operations, the preferred starch bases to be used are those which contain cationic groups such as quaternary ammonium or diethylaminoalkyl groups, and a particularly preferred starch herein is the diethylaminoethyl ether of corn starch. It is to be noted that the starch base employed herein must be in its granular form, i.e., it must be any amylaceous material which has not lost its granular polarization crosses and is capable of swelling. However, it is possible in the practice of the process herein to employ a granular starch of which a small portion has been partially swelled by any known means or homogenized by subjecting it to shear.

The alkali metal phosphate salts used to impregnate the starch are preferably tripolyphosphate salts because they phosphorylate starch at only moderate temperatures, resulting in lower energy requirements; however, as mentioned above, orthophosphate and pyrophosphate salts may also be employed herein. The tripolyphosphate salt has two anhydride linkages, as shown in the structure below, which contribute to the greater phosphorylating efficiency of this salt:

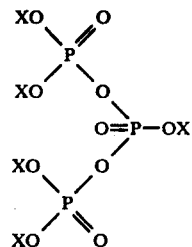

wherein X represents an alkali metal of group I of the Periodic Table. Examples of such salts include sodium tripolyphosphate, potassium tripolyphosphate, lithium tripolyphosphate, etc. The particularly preferred salt herein is sodium tripolyphosphate because it is the least expensive and most readily available of the tripolyphosphate salts.

Orthophosphate salts suitable herein are, for example, sodium dihydrogen orthophosphate and disodium hydrogen orthophosphate, while suitable pyrophosphate salts include, for example, tetrasodium pyrophosphate and disodium dihydrogen pyrophosphate.

It is also possible to employ mixtures of the above-described salts, if desired. Particularly preferred herein is a mixture of tripolyphosphate salt with a small amount of orthophosphate salt.

The preparation of the reagent solution may be carried out by any method desired, but in general the phosphate salt is dissolved in water and then diluted to give a solution with the necessary concentration for impregnation. The ortho- and pyrophosphate salts, which are very soluble in water, form highly concentrated solutions which can be readily stored and diluted for use as necessary. Tripolyphosphate salts, on the other hand, dissolve to form solutions of only about 13–18% concentration, which solutions may be diluted further for impregnation purposes. For convenience of storage and preparation, tripolyphosphate impregnating solutions are preferably obtained by diluting the concentrated reagent solution comprising water, 20–36% by weight of the salt, and an amount of a water-soluble acid (or mixture of acids) having a $pK_a$ less than 4.7 sufficient to obtain a solution pH of 2.8–5.0, as described in U.S. Pat. No. 4,166,173, the disclosure of which is incorporated herein by reference. Dilution is ordinarily accomplished in a mixing chamber just prior to impregnation.

The final concentration of the reagent solution used for impregnation depends on several factors, including, for example, the type of phosphate salt employed, the thickness of the starch cake on the rotary vacuum filter, the amount of vacuum applied to the filter, the viscosity and pH of the solution, the final product desired, and the porosity of the starch cake employed. Potato starch, for example, yields a very porous cake and may require a more highly concentrated solution than other starches. In general, the concentration of the solution should be such that the impregnation of the starch cake will be as uniform as possible in terms of penetration and distribution of the reagent throughout the starch. For a rotary vacuum filter having a typical vacuum of about 16 in. (410 mm.) mercury, when corn starch with a cake thickness of 0.75 in. (1.9 cm.) is employed, the amount of solids in the impregnating solution is about 4–6% by weight, based on total solution, higher concentrations resulting in uneven distribution of the salt within the cake. If the concentrated reagent solution of tripolyphosphate salt is employed, it is preferably diluted with water by a factor of about 8 to 13 to obtain the final solution.

The operable pH of the impregnating solution depends mainly on the phosphate salt employed and on the product intended. Thus, for alkali metal tripolyphosphate salts, the pH is generally in the range of about 2.8 to 5.2, preferably 4.2–4.8, to achieve sufficient phosphorylation. The tripolyphosphate salt is less stable at a pH below about 2.8, and the reaction efficiency and solubility of the salt are adversely affected when the pH of the solution is above about 5.2. For pyro- and orthophosphate salts, the applicable pH range is ordinarily broader, i.e., about 2.8 to 8.0, because of the relatively high solubility of these salts. Occasionally, a pH lower than 2.8 or higher than 8.0 may be desirable for these latter salts and called for the final properties and intended use of the product. The process of the invention is thus not limited by pH.

In the improved pollution-free process herein, the starch is first impregnated with the aqueous reagent solution, followed by drying and heat-reacting by known procedures. In the novel impregnation step, an aqueous slurry of the starch is formed, which slurry is then dewatered to form a moist starch cake on a rotary vacuum filter. Prior to filtration, the starch slurry may be further diluted with water to adjust slurry density, and the pH adjusted to facilitate the impregnation step, if necessary. The desired pH of the slurry will depend on the phosphate salt, the starch utilized, and the desired product.

The moisture content of the starch cake must be no greater than about 45%, because if the cake contains too much water, the starch is impossible to handle during impregnation. Ordinarily, however, the starch cake contains at least 35% by weight moisture, and usually 40–44%.

The rotary vacuum filter is a conventional filtering apparatus, such as of the BIRD or FEINC (trademarks) variety, which consists of a cloth-covered drum revolving in a tank (filter bed) filled with slurry to be filtered. The surface of the drum is divided into compartments which are connected to an automatic valve so that a vacuum can be applied to each individually. As the drum rotates, each compartment goes through the same cycle of operation—filtering, dewatering and discharging the starch cake—which is controlled in a repeating sequence. A vacuum applied to the submerged segments causes the mother liquor to flow through the filter cloth, while the solids are stopped on the outside, forming the cake. As the sections emerge from the tank, the vacuum dewaters the starch cake while the drum is rotating to the point of discharge. When the starch cake is sufficiently dewatered by filtration, as, for example, when the drum has rotated one-eighth of a revolution after leaving the surface of the starch slurry, the reagent solution is continuously sprayed onto the rotating starch cake. The spraying apparatus typically consists of a spray manifold having, e.g., thirteen nozzles with a 0.078-in. (0.20-cm.) equivalent orifice diameter and having a pressure of 10–25 psig. (0.7–1.8 kg./cm.$^2$). When all of the mother liquor has been removed from the starch cake, the vacuum is discontinued and the cake discharged from the drum with the assistance of a string discharge technique. Parallel strings spaced about 0.5 in. (1.3 cm.) apart pass around the drum. The cake is built up over these strings so that as the strings leave the drum, the cake is lifted away from the cloth by the strings. When the cake is removed from the drum, it is cut into pieces, dried and heat-reacted. Meanwhile, in a continuous cycle, more starch cake is formed on the drum, sprayed, and removed from the drum as described above.

The amount of reagent solution added to the starch cake for impregnation purposes will vary depending, for example, on the concentration, viscosity, acidity, and type of reagent solution, the type of starch employed, the rotary vacuum filter employed, and the end-use of the starch product. Because of these variable dependencies, it is more accurate to express the amount of reagent added in terms of the percentage of total phosphate salt used to impregnate the starch cake, which percentage is based on starch solids having a normal moisture content of between about 10 and 14% and on the average about 12%. This amount must be sufficient to achieve efficient impregnation of the starch and in any case must be at least about 0.5% by weight, and preferably at least about 1%. The maximum amount is ordinarily determined by the desired product and the amount of reagent the effluent can tolerate, as well as the type of salt used. Thus, the upper limit can be as high as 15% or more, particularly when the highly soluble ortho- or pyrophosphate salts are employed. In the preparation of amphoteric starches used in papermaking, e.g., as pigment retention aids, the amount of reagent added is generally lower than that added in the preparation of orthophosphate starch monoesters for food use.

After the reagent solution has been added to the starch cake, the thus-impregnated starch is dried to a moisture content of less than about 20 and heat-reacted by any of the known procedures. Hence, as described in U.S. Pat. No. 2,884,413, incorporated herein by reference, the starch may be dried in typical starch driers such as those wherein heated air is forced through the dryer. The alternative method wherein the impregnated starch is dried in a flash dryer and heat-reacted in any equipment designed for heating starch is also applicable to the present method. The typical temperatures employed for heat-reacting are about 203°–320° F. (95°–160° C.), and preferably 230°–290° F. (110°–143° C.), and the typical times for heat-reacting range from about 10 minutes to about 4 hours.

It is to be recognized that the present process is not limited to any particular method of drying the starch. The improvement and novelty reside in the impregnation step, wherein a solution of reagent is added to a starch cake in a rotary vacuum filter such that the reagent uniformly penetrates the starch to provide a pollution-free, continuous process.

The following examples will illustrate various embodiments of the present process. In the examples, all parts and percentages are given by weight and all temperatures in degrees Celsius unless otherwise noted.

EXAMPLE I

This example illustrates the preparation of a concentrated reagent solution of sodium tripolyphosphate useful in the present process.

To a total of about 100 parts water in a jacketed container were added, in sequential increments with stirring, 64.7 parts sodium tripolyphosphate, 11.8 parts of 87% phosphoric acid, and 12.1 parts of 37% hydrochloric acid to attain a final pH of 4.4–4.8. The temperature of the mixture was maintained at or below 37° C. through some jacket water cooling. The resulting solution was clear, and when analyzed by refractive index and NMR spectrometry, was found to contain 34% sodium tripolyphosphate dissolved therein (and a minor amount of orthophosphate salt). The reagent solution was stored at room temperature.

EXAMPLE II

Corn starch was reacted with diethylaminoethyl chloride hydrocloride in accordance with the procedure described in U.S. Pat. No. 3,459,632, Example I, Part A. The resulting diethylaminoethyl ether of corn starch was acidified to pH 3.2 and washed. A total of 300 g. of the washed starch thus obtained was slurried in water to give 930 g. of total slurry. This slurry was then filtered on a laboratory Buchner funnel having about a six-inch (15-cm.) inside diameter. The amount of starch filtered was such as to provide a filter cake having a moisture content of less than 44% and a thickness of 0.75 in. (1.9 cm.). The vacuum on the Buchner funnel was controlled at about 16 in. (410 mm.) Hg. Employing these conditions with the Buchner funnel simulates the conditions encountered on a rotary vacuum filter, with the pressure and cake thickness comparable.

Just as the last of the surface water was drawn through the starch cake, the cake was sprayed with 135.2 g. of an impregnating solution prepared by diluting 13.2 g. of the reagent solution of Example I with 122 g. (about 12 volumes) of water. Spraying was continued until the starch cake retained sufficient amounts of total phosphate salts to the extent of about 1.7% of the weight of the starch on a 12% moisture basis. The phosphorus content of the resulting starch cake was 0.44%.

The impregnated starch cake was then dried on a Dietert Dryer to about 10.0% moisture and screened through an 80 Mesh USS Sieve to produce a coarse powder. This powder was reacted in an oven by heating from room temperature to 230° F. (110° C.) over a period of 10 minutes to obtain the orthophosphate starch monoester product.

EXAMPLE III

The starch cake of Example II was impregnated, dried and heat-reacted as described in Example II except that before impregnation the starch was not washed.

By a comparision of the final product obtained herein with that of Example II, it was found that a separate washing of the starch is not needed for effective phosphorylation of starch, and that in the process herein, the dilute reagent solution effectively removes most of the salts remaining from the cationic derivatization of the starch.

The final product of the process herein was evaluated in paper wet-end addition as described in Example III of U.S. Pat. No. 4,166,173, using as control the same standard orthophosphate starch monoester (which is a commercial amphoteric starch prepared by the conventional suspension method). The results are indicated in Table I.

TABLE I

| | Concentration of Alum* | | |
|---|---|---|---|
| | 0 | 4.0 | 11.0 |
| Pigment Retention (as a percent | 100 | 100 | 98 |

TABLE I-continued

| | Concentration of Alum* | | |
|---|---|---|---|
| | 0 | 4.0 | 11.0 |
| of control) | | | |

*Based on the percent, by weight of the dry pulp, yielding pH values of 7.6, 6.0 and 4.6, respectively.

A similar impregnation using 1% of the salt based on starch solids yields comparable results.

The data indicate that the product of the process herein described is sufficiently phosphorylated to have a pigment retention ability comparable to that of a commercial product prepared using the suspension method of impregnation employed in the prior art.

EXAMPLE IV

A total of 200 g. of the cationic corn starch of Example II was suspended in 250 ml. of water and adjusted to pH 5.8. In a separate container 60.0 g. of sodium dihydrogen orthophosphate monohydrate was dissolved in sufficient water to give 90 g. of solution. The pH of the solution was raised from about 4.5 to 5.8 with 50% sodium hydroxide solution to give 111 g. of a solution having 58.8% combined disodium hydrogen orthophosphate and sodium dihydrogen orthophosphate salts.

The slurry of starch was filtered through Whatman No. 1 filter paper on a laboratory Buchner funnel having an 11-cm. inside diameter until the starch cake formed cracks. The vacuum was thereafter released, the cracks pressed sealed, and 25.5 g. of the prepared orthophosphate solution was poured onto the starch cake, uniformly covering its entire surface, whereupon the vacuum (about 16 in. mercury) was applied until the liquid filtered through the starch cake and the cake cracked. The cake was thus impregnated with about 7.5% total phosphate salt, based on starch solids. About 56 g. of filtrate, including washings of the flask with water, was collected, in which there was 0.008% phosphorus. The impregnated starch was thereafter dried and heat-reacted at 140° C. for about two hours to give a product having 1.3% total phosphorus, dry basis, and 0.25% bound phosphorus. When evaluated in paper wet-end addition as described in Example III, the product performed as well as the commercial standard as a pigment retention aid in the presence of alum.

EXAMPLE V

Tapioca starch was reacted with diethylaminoethyl chloride hydrochloride as described in U.S. Pat. No. 3,459,632, Example I, Part A. The resulting cationic starch had a nitrogen content of 0.21% dry basis. A total of 200 g. of the washed starch thus obtained was slurried in 250 ml. water, and the slurry filtered on a laboratory Buchner funnel as described in Example II. When the cracks in the washed starch cake were pressed sealed, 20 g. of the reagent solution of Example I, which had been diluted with 200 ml. water, was sprayed over the starch cake such that about 3.9% by weight of total phosphate salt was retained on the cake. The resulting filtrate (214 g.) and the starch cake had phosphorus contents of 0.25% and 0.69%, respectively.

The impregnated starch cake was then dried to about 6% moisture in a forced-air device with air temperature ranging from 130° to 135° C. and heat-reacted as described in Example II.

EXAMPLE VI

In this example, the sequence of modification was reversed. Thus, native tapioca starch was impregnated, dried and heat-reacted with sodium tripolyphosphate as described in Example V to obtain a tapioca starch phosphate. This starch was then resuspended in water and reacted with diethylaminoethyl chloride hydrochloride as described previously. The results of the evaluation in paper wet-end addition given in Table II indicate that the order of reaction in preparing amphoteric starches is not important.

TABLE II

| Sample | Phosphorus Content (% by Weight) | Pigment Retention (as a percent of control*) Concentration of Alum | | |
|---|---|---|---|---|
| | | 0 | 4.0 | 11.0 |
| Product of Example VI | 0.08 | 115 | 104 | 101 |
| Product of Example V | 0.08 | 106 | 106 | 100 |

*Control is the same as in previous examples.

EXAMPLE VII

Two solutions of tetrasodium pyrophosphate were prepared by dissolving 20 g. of tetrasodium pyrophosphate decahydrate in 80 ml. of water and adjusting the pH to 7.0 (Solution 1) and 8.0 (Solution 2), respectively, with hydrochloric acid. A total of 100 g. of native tapioca starch was suspended in 125 ml. water, adjusted to pH 7.0 (Starch 1) and filtered on a Buchner funnel as described in Example IV. A total of 60 g. of Solution 1 was poured onto the filter cake of Starch 1, uniformly covering the entire surface, and vacuum was applied until the liquid filtered through the starch cake. The amount of phosphate salt retained was about 12%, based on starch solids. The above filtering procedure was repeated except that before filtration the starch was adjusted to pH 8.0 (Starch 2), and Solution 2 was used instead of Solution 1. The amounts of filtrate and phosphorus content of each filtrate are indicated in Table III. The impregnated cakes were thereafter dried at 140° C., and a portion of each dried sample was further heat-reacted in a forced-air oven at 140° C. to form Starches 1B and 2B. As can be seen from Table III, phosphorylated materials were obtained with only minimal loss of phosphate to the filtrate.

TABLE III

| Starch Sample | pH Employed | Weight of Filtrate(g.) | Phosphorus Content in Filtrate(g.) | Heat Reaction After Drying | Phosphorus Content (%) | |
|---|---|---|---|---|---|---|
| | | | | | Total | Bound |
| 1A | 7.0 | 53 | 0.13 | None | 1.46 | 0.077 |
| 1B | | | | 140° C. | | 0.27 |
| 2A | 8.0 | 47 | <0.13 | None | 0.87 | 0.085 |
| 2B | | | | 140° C. | | 0.24 |

The starch products herein showed enhanced absorption of methylene blue and are suitable for direct use where highly anionic starches are required. They may also be further modified, e.g., by introduction of cationic groups to become amphoteric.

EXAMPLE VIII

This example illustrates the preparation of an orthophosphate starch monoester using the rotary vacuum filter in accordance with the present process.

Corn starch was reacted with diethylaminoethyl chloride hydrochloride as described in Example II. Laboratory analysis of a sample of this starch revealed a nitrogen content of 0.33%, indicating good reaction efficiency. The starch was diluted with water to give a slurry density of 18.5° Bé. (1.15 g./ml., solids content of 32.8%) and a pH of 3.2.

The slurry of cationic starch was pumped to the bed of a FEINC (trademark of Filtration Engineers Inc.) Rotary Vacuum Filter. The slurry was further diluted with water in the transfer pipeline and in the filter bed to give a slurry density of 12.5°–14.0° Bé. (1.10–1.11 g./ml.). The pH of the slurry was adjusted to 2.9–3.4.

The particular FEINC apparatus employed was 10 feet (3.0 m.) in both length and diameter, and was equipped with a continuous string discharge which allowed the impregnated starch cake to be lifted off of the filter. As the drum filter emerged from the tank containing the starch slurry, the vacuum on the filter drew water from the starch cake being formed. The starch cake formed on the filter had a moisture content of about 43%, was ½ to ⅝ in. (1.3–1.6 cm.) in thickness, and travelled at a linear speed, at the circumference of the drum, of 3.6 ft./min. (1.1 m./min.). When the drum had rotated approximately 45 degrees (⅛th of a revolution) after leaving the surface of the starch slurry, the reagent solution, prepared as follows, was sprayed onto the cake: The concentrated reagent solution of Example 1 having a density of 11.5 lb./gal. (1.38 kg./l.), and flowing at a rate of 0.40–0.48 gal./min. (1.5–1.8 l./min.), was continuously diluted with water which flowed at 3.7–4.0 gal./min. (14–15 l./min.) in an in-line, "static"-type mixing chamber. Thus, on the average, the solution was sprayed at the rate of 4.3 gal./min. (16 l./min.) and contained 5.6% total solids, equivalent to 0.52 lb. (0.24 kg.) phosphorus, per minute. The spraying itself was effected by a manifold fitted with thirteen spray nozzles and maintained at 12–25 psig. (0.8–1.8 kg./cm.$^2$) pressure by a pump on the solution system. The reagent solution was drawn through the cake by a vacuum of 16–18 in. (410–460 mm.) Hg, which pressure was maintained throughout the impregnation step. After the starch cake had received the solution spray, the drum was rotated approximately 67 degrees before reaching the discharge point, allowing time for final dewatering.

In the above system, the flow rate of starch through the filter averaged about 5000 lb./hour (2300 kg./hour), calculated on a 12% moisture basis. The average amount of total phosphate salt retained on the starch was about 2.3% by weight, based on starch solids. After impregnation the starch cake was discharged from the filter, broken into pieces, and dried and heat-reacted at a temperature varying from 175° to 270° F. (79°–132° C.). The starch temperature at the dryer discharge ranged from 230° to 250° F. (110°–121° C.).

After discharge from the dryer, the starch product was conveyed to a packing hopper and then evaluated for phosphorus content and for pigment retention in paper. The content of bound phosphorus was 0.07%. The retention results, summarized in Table IV, indicate that the starch was satisfactorily phosphorylated by this method.

TABLE IV

|  | Pigment Retention (as a percent of control*) Concentration of Alum | | |
|---|---|---|---|
|  | 0 | 4.0 | 11.0 |
| Product of Example VIII | 97.8 | 100.0 | 95.9 |
| Diethylaminoethylated corn starch without phosphorylation (U.S. 3,459,632, Example I, Part A) | 106.0 | 74.0 | 84.0 |

*Control is same as in previous examples.

EXAMPLE IX

Native corn starch, in an amount of 100 g., was suspended in 125 g. water and adjusted to a pH of 2.5 with hydrochloric acid. This slurry was then filtered through Whatman #1 filter paper on a Buchner funnel having a 10-cm. diameter. A total of 36 g. of the reagent solution of Example I was adjusted to pH 2.9 with concentrated HCl and poured over the filter cake as described previously, thereby impregnating the starch to the extent of about 13.9% total phosphate salt. After filtration, the starch was dried to less than 6% moisture in a forced-air device and heat-reacted in a glass jar at 140° C. for 3 hours. The product, when cooked in 4 parts of water per part of starch, had a pH of about 3.2. The cook was thin and stable and did not congeal on cooling.

Summarizing, a substantially pollution-free, continuous process for phosphorylating starch with a selected alkali metal phosphate salt or mixtures thereof is provided whereby the impregnation step is effected using a rotary vacuum filter.

Now that the preferred embodiments of the present process have been described in detail, various modifications and improvements thereon will become readily apparent to those skilled in the art. Accordingly, the spirit and scope are to be limited only by the appended claims, and not by the foregoing specification.

What is claimed is:

1. A continuous process for phosphorylating starch comprising the steps of:
   a. forming a moist granular starch cake on the drum of a rotary vacuum filter;
   b. dewatering said starch cake by vacuum to a moisture level of 35–45% by weight while the drum of the rotary vacuum filter is rotating;
   c. spraying onto said starch cake an aqueous solution of an alkali metal phosphate salt selected from the group consisting of tripolyphosphate salt, orthophosphate salt, pyrophosphate salt and mixtures thereof in an amount which impregnates said starch cake with at least about 0.5% by weight of total phosphate salt, based on starch solids;
   d. dewatering said sprayed starch cake;
   e. discharaging said starch cake from the rotary vacuum filter, each of steps a–e being conducted cyclically and continuously as the drum rotates;
   f. drying said starch cake; and
   g. heat-reacting said dried starch to obtain an orthophosphate starch monoester.

2. The process of claim 1 wherein said starch cake contains 40–44% by weight moisture.

3. The process of claim 1 wherein said starch cake is impregnated with at least about 1% by weight of total phosphate salt, based on starch solids.

4. The process of claim 1 wherein said starch is a cationic starch.

5. The process of claim 1 wherein after heat-reaction of the starch, the starch is made to be amphoteric.

6. The process of claim 1 wherein said phosphate salt is a tripolyphosphate salt or a mixture of tripolyphosphate salt and orthophosphate salt.

7. The process of claim 6 wherein said phosphate salt solution has a pH of 2.8–5.2.

8. The process of claim 6 wherein said phosphate salt solution is obtained by diluting with water a concentrated reagent solution comprising water, 20–36% by weight of said salt, and an amount of a water-soluble acid or mixture of acids having a $pK_a$ less than 4.7 sufficient to obtain a solution pH of 2.8–5.0.

9. The process of claim 1 wherein said phosphate salt is an alkali metal orthophosphate salt or pyrophosphate salt.

10. The process of claim 9 wherein said phosphate salt solution has a pH of 2.8–8.0.

* * * * *